(12) United States Patent
Reimann et al.

(10) Patent No.: US 12,204,579 B2
(45) Date of Patent: Jan. 21, 2025

(54) SYSTEM AND METHOD FOR GENERATION OF A UNIQUE IDENTIFICATION CODE OF AN INDUSTRIAL COMMODITY

(71) Applicant: HEXAGON TECHNOLOGY CENTER GMBH, Heerbrugg (CH)

(72) Inventors: Bernd Reimann, Heerbrugg (CH); Akshit Budhraja, Heerbrugg (CH); Krishan Kumar Meghani, Hyderabad (IN); Himanshu Mishra, Ghaziabad (IN); Mohammad Rahil, Eluru (IN); Sathish Kumar Mogili, Hyderabad (IN); Ankan Sengupta, Secunderabad (IN); Srinivas Mallepally, Secunderabad (IN)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 134 days.

(21) Appl. No.: 17/865,317

(22) Filed: Jul. 14, 2022

(65) Prior Publication Data
US 2023/0028142 A1 Jan. 26, 2023

(30) Foreign Application Priority Data
Jul. 14, 2021 (IN) .............................. 202111031736

(51) Int. Cl.
*G06F 16/38* (2019.01)
*G06F 16/33* (2019.01)
*G06F 16/332* (2019.01)

(52) U.S. Cl.
CPC ........ *G06F 16/381* (2019.01); *G06F 16/3329* (2019.01); *G06F 16/3334* (2019.01)

(58) Field of Classification Search
CPC ..................................................... G06F 16/381
See application file for complete search history.

(56) References Cited

U.S. PATENT DOCUMENTS

| 8,190,486 B1 * | 5/2012 | Ouimet | G06Q 30/02 705/26.1 |
| 2011/0276564 A1 * | 11/2011 | Vailaya | G06F 16/334 707/E17.084 |
| 2015/0310383 A1 * | 10/2015 | Iser | G06Q 30/0635 705/26.81 |
| 2022/0058227 A1 * | 2/2022 | Balakrishnan | G06Q 30/0627 |

* cited by examiner

*Primary Examiner* — Van H Oberly
(74) *Attorney, Agent, or Firm* — Maschoff Brennan

(57) ABSTRACT

Systems and methods thereof, of generating a unique identification code for an industrial commodity. The method includes receiving a user query indicative of at least one constructional and operational characteristic of the commodity, inspecting the user query to determine whether the user query is complete for identification of the commodity, updating the user query based on the inspection, identifying at least one attribute of the commodity from the updated user query, based on a list of predefined attributes of the commodity, mapping the at least one attribute to at least one of predefined attribute types, predefined regional standards, predefined commodity rules, and predefined commodity types, and generating the unique identification code for the commodity, based on the mapping. The predefined attribute types may be a predefined commodity group and a predefined commodity part.

4 Claims, 12 Drawing Sheets

SYSTEM AND METHOD FOR GENERATION OF A UNIQUE IDENTIFICATION CODE OF AN INDUSTRIAL COMMODITY

FIELD

The present disclosure relates generally to the technical field of commodity code generation, and more particularly, to the methods and systems for generating unique identification codes for industrial commodities, such as piping commodities based on artificial intelligence.

BACKGROUND

In an enterprise or project piping environment, thousands of piping components are available. Countless variations of pipes, fittings, bolts, gaskets, valves and other components exist. A piping class defines a subset of components to be used for specific media, pressure, and temperature conditions. Since only a correct pipe class can guarantee the accurate operation of the plant, the pipe class is a very important document and the downstream processes must follow the rules created in the pipe class.

In the design process of a plant, a process diagram may be first created. In the process diagram, the material flows and material properties, such as physical conditions, pressure, temperature, and other data may be presented. The process diagram has no relation to the components that will be used for construction and, normally, does not contain any pipe class data.

Based on the process diagram, the Piping and Instrumentation Diagram (P&ID) is created, by adding more details describing the process. The media flows and their conditions are described in more detail. The P&ID specifies the temperature/pressure relation and the diameters as well as the selection of the pipe classes for all lines. Based on the pipe class definition, the components, such as valves and fittings, are pre-selected and an initial material estimation is produced. In the downstream process of piping design, the pipe class and the P&ID are used as basic documents for further engineering.

The commodity codes are used to uniquely describe materials through a project life cycle while employing sophisticated and exhaustive rules to maintain material descriptions. The commodity code can be defined as the third level for bulk material. The commodity codes identify and describe the components with all their size-independent properties. For example, the commodity code properties are material, dimensional standard, end preparation, and so forth.

Currently, the commodity code is generated by matching the description of a particular commodity with the stored descriptions in the database. Further, the process of representing a large database of descriptions with their respective commodity codes is done manually. Manually creating these commodity codes by studying the descriptions, breaking down into codes based on the descriptions in the database, identifying the rule to create the commodity code and arriving at it is a time intensive process. Considering that there would be thousands of available components in a piping system, there is a lot of effort involved. Furthermore, the absence of a standard convention for units or abbreviations, in the description, adds to the complexity of the problem. For example, predefined schedule to generate subsequent unique regional description or incorrect/misspelled/missing word in the description, or incomplete description, or lack of a standard format for the commodity code may not ensure that generating the commodity code happens always in the same way. An automated way of generating their respective commodity codes for these descriptions will greatly speed up the process. Therefore, there is a need of an improved technique for generating a commodity code which may not only speed up the process of generating a commodity code but also ensure that the commodity code is generated the same way even in case of regional description or incorrect/misspelled/missing word in the description, or incomplete description, thereby, increase the quality of the commodity code, by learning during the generation of the commodity codes.

SUMMARY

This summary is provided to introduce a selection of concepts, in a simplified format, that are further described in the detailed description. This summary is neither intended to identify key or essential inventive concepts and nor is it intended for determining the scope of the claims.

An embodiment includes a method of training a model for a generation of a unique identification code for an industrial commodity. The method includes retrieving at least one user description indicative of at least one constructional and operational characteristic of the commodity. At least one user description is retrieved from a first database. The method further includes identifying at least one attribute of the commodity from at least one user description. The method furthermore includes mapping at least one attribute to at least one of predefined attribute types, predefined regional standards, predefined commodity rules, and predefined commodity types.

The attribute types, the regional standards, the commodity rules, and the predefined commodity types are defined based on the information relating to similar commodities received from a second database over a period of time. The method furthermore includes the step of identifying a format of the unique identification code to be generated for the commodity, based on the mapping. The unique identification code or the commodity code may include at least one of the letters and numerals. The predefined attribute types may include a predefined commodity group and a predefined commodity part. The at least one attribute from the at least one description may be identified based on at least one of domain-specific standards, specification of the commodity, attribute sequences, and a structure of the commodity code.

Another embodiment includes a method of generating a unique identification code for an industrial commodity. The method includes receiving a user query indicative of at least one constructional and operational characteristic of the commodity. The method further includes inspecting the user query to determine whether the user query is complete for identification of the commodity. The user query is inspected for at least one of: a missing word, a misspelled word, an unseen word, and an abbreviated word based on a plurality of pre-stored words relating to the commodity. The method furthermore includes updating the user query based on the inspection. The method furthermore includes identifying at least one attribute of the commodity from the updated user query, based on a list of predefined attributes of the commodity. The method furthermore includes mapping the at least one attribute to at least one of predefined attribute types, predefined regional standards, predefined commodity rules, and predefined commodity types. The method furthermore includes generating the unique identification code for the commodity, based on the mapping. The predefined attribute types may be a predefined commodity group and a predefined commodity part.

Another embodiment includes a system of training a model for the generation of a unique identification code for an industrial commodity. The system includes a retrieving module, a text segmentation module, and a rule identification module. The retrieving module is adapted to retrieve at least one user description indicative of at least one constructional and operational characteristic of the commodity. The at least one user description is retrieved from at least one database. The text segmentation module is in communication with the retrieving module and adapted to: identify at least one attribute from each of the user descriptions, and map the at least one attribute to at least one of predefined attribute types, predefined regional standards, predefined commodity rules, and predefined commodity types. The attribute types, the predefined regional standards, the predefined commodity rules, and the predefined commodity types, may be defined based on information relating to similar commodities received from a second database over a period of time. The rule identification module is in communication with the text segmentation module and adapted to identify a format of the unique identification code to be generated for the commodity, based on at least one of the predefined attribute types, the predefined regional standards, the predefined commodity rules, and the predefined commodity types. As disclosed earlier, the unique identification code or commodity code includes at least one of letters and numerals.

Another embodiment includes a system of generating a unique identification code for an industrial commodity. The system includes a retrieving module, a text segmentation module, and a rule identification module. The retrieving module is adapted to receive a user query indicative of at least one constructional and operational characteristic of the commodity, inspect the user query to determine whether the user query is complete for identification of the commodity, and update the user query based on the inspection. The user query is inspected for at least one of: a missing word, a misspelled word, an unseen word, and an abbreviated word based on a plurality of pre-stored words relating to the commodity. The text segmentation module is in communication with the retrieving module, and adapted to: identify at least one attribute of the commodity from the updated user query, based on a list of predefined attributes of the commodity, and map the at least one of predefined attribute types, predefined regional standards, predefined commodity rules, and predefined commodity types. The rule identification module is in communication with the text segmentation module and adapted to generate the unique identification code for the commodity, based on the mapping.

To further clarify the advantages and features, a more particular description will be rendered by reference to specific embodiments thereof, which is illustrated in the appended drawings. It is appreciated that these drawings depict only some embodiments and are therefore not to be considered limiting of its scope. Aspects will be described and explained with additional specificity and detail with the accompanying drawings.

BRIEF DESCRIPTION OF THE DRAWINGS

These and other features, aspects, and advantages will become better understood when the following detailed description is read with reference to the accompanying drawings in which like characters represent like parts throughout the drawings, wherein.

Figure 1:
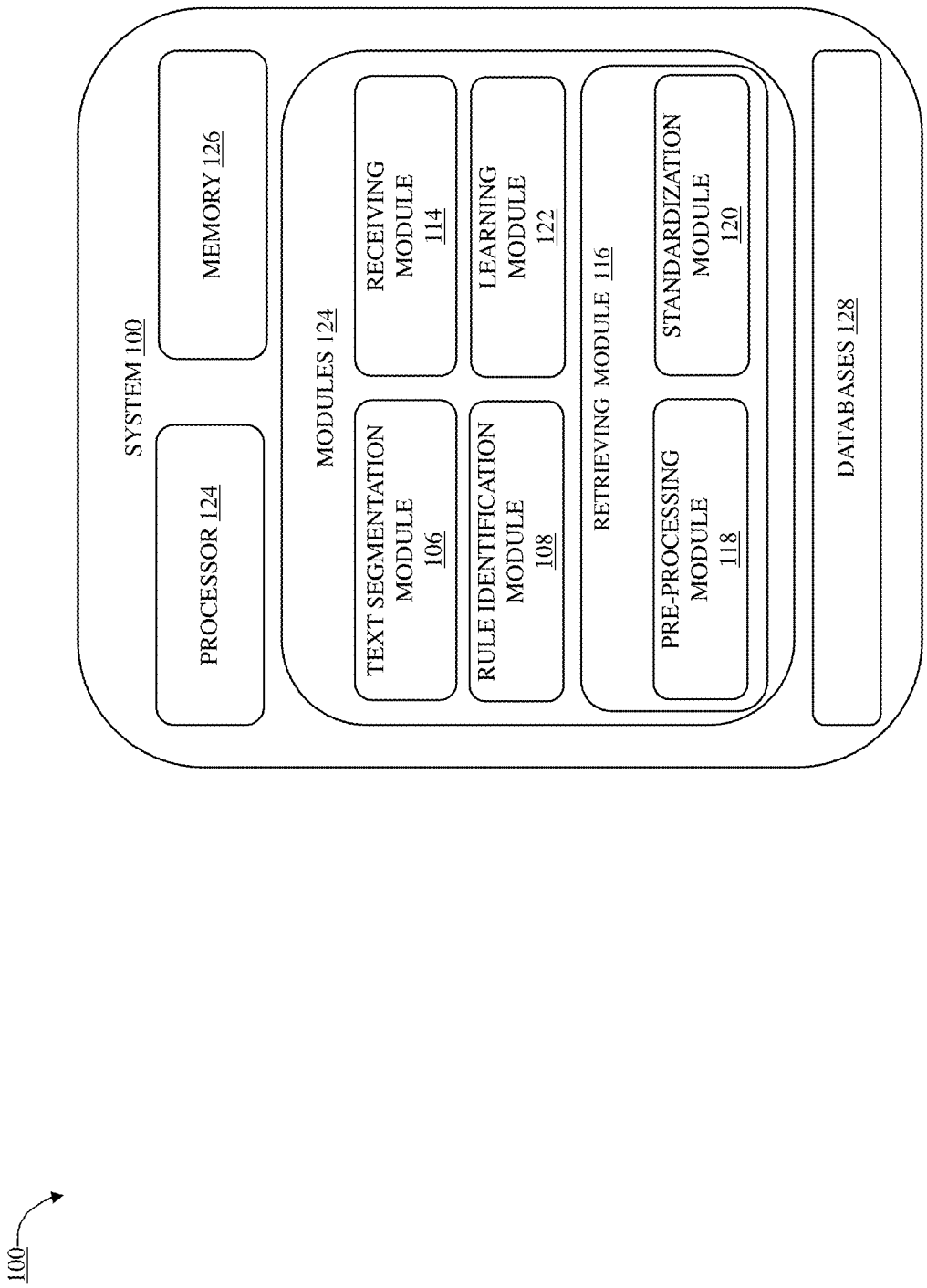
FIG. 1 illustrates a schematic block diagram of a system for generation of a unique identification code for an industrial commodity, according to an embodiment of the present disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects. Furthermore, in terms of the construction of the device, one or more components of the device may have been represented in the drawings by conventional symbols, and the drawings may show only those specific details that are pertinent to understanding the embodiments so as not to obscure the drawings with details that will be readily apparent to those of ordinary skill in the art having the benefit of the description herein.

DETAILED DESCRIPTION

For the purpose of promoting an understanding of the principles, reference will now be made to the embodiment illustrated in the drawings and specific language will be used to describe the same. It will nevertheless be understood that no limitation of the scope is thereby intended, such alterations and further modifications in the illustrated system, and such further applications of the principles as illustrated therein being contemplated as would normally occur to one skilled in the art. Unless otherwise defined, all technical and scientific terms used herein have the same meaning as commonly understood by one of ordinary skilled in the art. The system, methods, and examples provided herein are illustrative only and not intended to be limiting.

For example, the term "some" as used herein may be understood as "none" or "one" or "more than one" or "all." Therefore, the terms "none," "one," "more than one," "more than one, but not all" or "all" would fall under the definition of "some." It should be appreciated by a person skilled in the art that the terminology and structure employed herein is for describing, teaching, and illuminating some embodiments and their specific features and elements and therefore, should not be construed to limit, restrict or reduce the spirit and scope of the claims or their equivalents in any way.

For example, any terms used herein such as, "includes," "comprises," "has," "consists," and similar grammatical variants do not specify an exact limitation or restriction, and certainly do not exclude the possible addition of one or more features or elements, unless otherwise stated. Further, such terms must not be taken to exclude the possible removal of one or more of the listed features and elements, unless otherwise stated, for example, by using the limiting language including, but not limited to, "must comprise" or "needs to include."

Reference is made herein to some "embodiments." It should be understood that an embodiment is an example of a possible implementation of any features and/or elements presented in the attached claims. Some embodiments have been described for the purpose of explaining one or more of the potential ways in which the specific features and/or elements of the attached claims fulfil the requirements of uniqueness, utility, and non-obviousness.

Use of the phrases and/or terms including, but not limited to, "a first embodiment," "a further embodiment," "an alternate embodiment," "one embodiment," "an embodiment," "multiple embodiments," "some embodiments," "other embodiments," "further embodiment", "furthermore embodiment", "additional embodiment" or other variants thereof do not necessarily refer to the same embodiments. Unless otherwise specified, one or more particular features and/or elements described in connection with one or more embodiments may be found in one embodiment, or may be found in more than one embodiment, or may be found in all embodiments, or maybe found in no embodiments. Although one or more features and/or elements may be described herein in the context of only a single embodiment, or in the context of more than one embodiment, or in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should not necessarily be taken as limiting factors to the attached claims. The attached claims and their legal equivalents can be realized in the context of embodiments other than the ones used as illustrative examples in the description below.

Embodiments will be described below in detail with reference to the accompanying drawings.

For the sake of clarity, the first digit of a reference numeral of each component of a system for the generation of commodity codes is indicative of the Figure number, in which the corresponding component is shown. For example, reference numerals starting with digit "1" are shown at least in FIG. 1. Similarly, reference numerals starting with digit "2" are shown at least in FIG. 2.

For the sake of better understanding, one or more mathematical formula/equations/symbols are included in the present disclosure, for example, to describe the modelling of one or more components/parts used to perform experiment for validating the aspects disclosed in the present disclosure. These formula/equations/symbols should not be construed as limiting features/concepts. These merely relate to the experimental data.

The disclosure relates generally to the technical field of commodity code generation, and more particularly, to methods and systems for generating a unique identification code for industrial commodities such as piping commodities, based on artificial intelligence. The commodity codes are used to uniquely describe materials through a project life cycle while employing sophisticated and exhaustive rules to maintain material descriptions.

The commodity code is an alphanumerical string that is generated according to user-definable rules. Each character represents a specific property of the commodity part. The commodity code is generated based on a user-definable commodity rule. The commodity rule defines a format for the commodity codes to be generated. The format may depend on various factors, such as the type of the commodity. Further, the format of the commodity code may include a plurality of predefined codes in a particular sequence, wherein each of the codes may be a predefined value corresponding to a predefined property/attribute of the commodity.

The properties/attributes of the commodity may be pre-stored in one or more tables. A table of the properties/attributes of the commodity may identify the property, for example, the design standard or material grade of the commodity. The tables may be divided into groups to clearly arrange the property values. For example, in a table called materials one could arrange the details in groups like steel materials, plastic materials, and so forth. The table details represent the property values, which are used to create the commodity codes and to describe the components.

Thus, it may be concluded from the above that the commodity rules and the tables of commodity attributes are the basis for all table detail-based or rule-based commodity codes. FIG. 11 illustrates a schematic process diagram of relations between a commodity rule 1102 and commodity attributes or properties, according to an embodiment of the present disclosure. FIG. 11 also illustrates generating a commodity code by using this rule and the properties. As illustrated, a commodity code 1110 is generated by selecting values 1106 corresponding to properties 1104 and their descriptions 1108 of a table relevant to properties/attributes of a commodity 1112, based on the commodity rule 1102. Methods and systems involved in the generation of the commodity code 1110 as illustrated in FIG. 11, may be better understood by the description, in the later part of this disclosure, particularly in conjunction with FIGS. 1-10.

To describe the same attributes, various textual representations can be used depending upon the taxonomies defined by the different stakeholders. Therefore, to standardize the cataloging of these textual descriptions, unique IDs are used—also known as commodity codes. Thus, the commodity codes are composed using a set of pre-defined rules and standards.

The commodity properties/attributes 1112 may depend upon on factors including, but not limited to, material, dimensional standard, and end preparation of the commodity 1112. Accordingly, the length of a commodity code 1110 may depend upon the number of the commodity properties/attributes 1112.

In an embodiment, the present disclosure includes a method of training a model for a generation of a unique identification code for an industrial commodity. The method includes retrieving at least one user description indicative of at least one constructional and operational characteristic of the commodity. The at least one user description is retrieved from a first database. The method further includes identifying at least one attribute of the commodity from the at least one user description. The method furthermore includes mapping the at least one attribute to at least one of predefined attribute types, predefined regional standards, predefined commodity rules, and predefined commodity types.

The attribute types, the regional standards, the commodity rules, and the predefined commodity types are defined based on the information relating to similar commodities received from a second database over a period of time. The method furthermore includes identifying a format of the unique identification code to be generated for the commodity, based on the mapping. The unique identification code or the commodity code includes the letters and numerals. The predefined attribute types may include a predefined commodity group and a predefined commodity part. The at least one attribute from the at least one description may be identified based on at least one of domain-specific standards, specification of the commodity, attribute sequences, and a structure of the commodity code. The method of training a model for a generation of a unique identification code for an industrial commodity, according to the first aspect, may further be understood by the description, in the later part of this disclosure, in conjunction with FIGS. 3, 6, and 9.

Another embodiment includes a method of generating a unique identification code for an industrial commodity. The method includes receiving a user query indicative of at least one constructional and operational characteristic of the commodity. The method further includes inspecting the user query to determine whether the user query is complete for identification of the commodity. The user query is inspected for at least one of: a missing word, a misspelled word, an unseen word, and an abbreviated word based on a plurality of pre-stored words relating to the commodity. The method furthermore includes updating the user query based on the inspection. The method furthermore includes identifying at least one attribute of the commodity from the updated user query, based on a list of predefined attributes of the commodity. The method furthermore includes mapping the at least one attribute to at least one of predefined attribute types, predefined regional standards, predefined commodity rules, and predefined commodity types. The method furthermore includes generating the unique identification code for the commodity, based on the mapping. The predefined attribute types may be a predefined commodity group and a predefined commodity part. The method of generating a unique identification code for an industrial commodity, according to the second aspect, may further be understood by the description, in the later part of this disclosure, in conjunction with FIGS. 4, 5, and 10.

In an alternative embodiment, the method includes receiving at least one of: a first user feedback on the updated user query, a second user feedback on the identification of the at least one attribute of the commodity from the updated user query, a third feedback on the commodity group and/or regional standards, and a fourth user feedback on the generated unique identification code. The method furthermore includes learning at least one of the first user feedback, the second user feedback, the third user feedback, and the fourth user feedback. The method furthermore includes generating the unique identification code for the commodity, based on the learning. The alternative embodiment of the second aspect may further be understood by the description, in the later part of this disclosure, in conjunction with FIGS. 4, 5, 7, 8*a* and 8*b*.

In another alternative embodiment, the learning takes place in at least one of: an online mode, and an offline mode: In the online mode, at least one of the modules gets updated independently on receiving corresponding new user feedback to generate subsequent unique identification codes based on the new user feedback in real-time. In the offline mode, at least one of the modules gets updated at a predefined schedule or in batches of a certain number of feedback items to generate subsequent unique identification codes based on the updates.

Another embodiment includes a system of training a model for the generation of a unique identification code for an industrial commodity. The system includes a retrieving module, a text segmentation module, and a rule identification module. The retrieving module is adapted to retrieve at least one user description indicative of at least one constructional and operational characteristic of the commodity. The at least one user description is retrieved from at least one database. The text segmentation module is in communication with the retrieving module and adapted to: identify at least one attribute from each of the user descriptions, and map the at least one attribute to at least one of predefined attribute types, predefined regional standards, predefined commodity rules, and predefined commodity types. The attribute types, the predefined regional standards, the predefined commodity rules, and the predefined commodity types, may be defined based on information relating to similar commodities received from a second database over a period of time. The rule identification module is in communication with the text segmentation module and adapted to identify a format of the unique identification code to be generated for the commodity, based on at least one of the predefined attribute types, the predefined regional standards, the predefined commodity rules, and the predefined commodity types. As disclosed earlier, the unique identification code or commodity code includes at least one of letters and numerals. The system of training a model for the generation of a unique identification code for a text segmentation module of an industrial commodity may further be understood by the description, in the later part of this disclosure, in conjunction with FIGS. 1, 2, 3, and 6.

In an alternative embodiment, the information relating to the similar commodity of the second database is a verified set of user descriptions generated during the subsequent training of the model, by at least one user. The alternative embodiment may further be understood by the description, in the later part of this disclosure, in conjunction with FIG. 7.

In another alternative embodiment, the trained model is used jointly with the sampled set of user descriptions from both the first and the second databases for further training of the trained model, by at least one user. The predefined attribute types includes a predefined commodity group and a predefined commodity part. The other alternative embodiment of the third aspect may further be understood by the description, in the later part of this disclosure, in conjunction with FIG. 8a and FIG. 8b.

Another embodiment includes a system of generating a unique identification code for an industrial commodity. The system includes a retrieving module, a text segmentation module, and a rule identification module. The retrieving module is adapted to receive a user query indicative of at least one constructional and operational characteristic of the commodity, inspect the user query to determine whether the user query is complete for identification of the commodity, and update the user query based on the inspection. Note that such user query might also be received using optical character recognition (OCR) tools from digitized/scanned documents. The user query is inspected for at least one of: a missing word, a misspelled word, an unseen word, and an abbreviated word based on a plurality of pre-stored words relating to the commodity. The text segmentation module is in communication with the retrieving module, and adapted to: identify at least one attribute of the commodity from the updated user query, based on a list of predefined attributes of the commodity, and map the at least one of predefined attribute types, predefined regional standards predefined commodity rules, and predefined commodity types. The rule identification module is in communication with the text segmentation module and adapted to generate the unique identification code for the commodity, based on the mapping. The system of generating a unique identification code for an industrial commodity may further be understood by the description, in the later part of this disclosure, in conjunction with FIGS. 1, 2, 4, 5, 7, 8a and 8b.

The predefined attribute/property types may include, but are not limited to, a predefined commodity group and a predefined commodity part.

In an alternative embodiment, the system further includes a receiving module adapted to receive at least one of: a first user feedback on the updated user query, a second user feedback on the identification of the at least one attribute of the commodity from the updated user query, a third feedback on the commodity group and/or regional standards, and a fourth user feedback on the generated unique identification code. The system furthermore includes a learning module in communication with the receiving module and adapted to learn at least one of the first user feedback, the second user feedback, the third user feedback, and the fourth user feedback. The rule identification module is in communication with the learning module and adapted to generate the unique identification code for the commodity, based on the learning. The alternative embodiment may further be understood by the description, in the later part of this disclosure, in conjunction with FIGS. 4, 5, 7, 8a and 8b.

The attributes/properties, and types thereof, as discussed hereinabove, and their corresponding unique ID/code may be understood from the following.

Table 1 provided below depicts an example of such a commodity description, where there are eight (8) unique attribute types that together describe a "Weld Neck Flange" commodity belonging to the "Flanges" commodity group.

TABLE 1

Example of a textual description of a part belonging to the commodity group "Flanges".

| Attribute Type | Attributes |
|---|---|
| Commodity group | Flanges |
| Commodity part | Weld neck flange |
| Dimension standard | Flanges and their joints—Circular flanges for pipes, valves, fittings and accessories, PN designated—Part 1: Steel flanges |

TABLE 1-continued

Example of a textual description of a part belonging to the commodity group "Flanges".

| Attribute Type | Attributes |
|---|---|
| Rating | PN 100 |
| End prep | Flat-face flanged end |
| Material | EN 10222-2 Grade P245GH (1.0352, 1.1) |
| Alias | Type 11 |
| Surface finish | EN 1092-1 Type A |

Table 2 provided below depicts an example of how a textual description "Weld neck flange, EN 1092-1, Flanges and their joints—Circular flanges for pipes, valves, fittings, and accessories, PN designated—Part 1: Steel flanges, PN 100, Flat-face flanged end, EN 10222-2 Grade P245GH (1.0352, 1.1), Type 11, EN 1092-1 Type A" as in the example of Table 1 is converted to a unique alphanumeric sequence, known as a commodity code.

TABLE 2

Example of a textual description being converted to a unique alphanumeric sequence: FWNEAAAIFFEAAYAADZEA.

| Attribute Type | Attributes | Codes |
|---|---|---|
| Commodity group | Flanges | F |
| Commodity part | Weld neck flange | WN |
| Dimension standard | Flanges and their joints—Circular flanges for pipes, valves, fittings and accessories, PN designated—Part 1: Steel flanges | AA |
| Rating | PN 100 | AI |
| End prep | Flat-face flanged end | FF |
| Material | EN 10222-2 Grade P245GH (1.0352, 1.1) | AAY |
| Alias | Type 11 | AAD |
| Surface finish | EN 1092-1 Type A | EA |

Table 3 provided below depicts an example of such a description, where there are ten (10) unique attribute types that together describe a "Gate Valve" commodity belonging to the "Gate Valve" commodity group.

TABLE 3

Example of a textual description of a part belonging to the commodity group "Valves".

| Attribute Type | Attributes |
|---|---|
| Commodity group | Gate Valves |
| Commodity part | Gate Valve, Solid Wedge |
| Dimension standard | Generic manufacturer |
| Rating | Class 150 |
| End prep | Raised-face flanged end |
| Material | ASTM A351-CF8M |
| Valve Body type | FP Bonnet |
| Valve Operator | Handwheel Operator |
| Alias Trim | 12 according to API 600, 602 Trim |
| Alias | Low Temperature Service |

Similarly, Table 4 provided below depicts an example of generating commodity code for the description "Gate Valve, Solid Wedge, Generic manufacturer, Class 150, Raised-face flanged end, FP Bonnet, Handwheel Operator, ASTM A351-CF8M, 12 according to API 600, 602 Trim, Low-Temperature Service" of Table 3.

TABLE 4

Example of a textual description being converted to a unique alphanumeric sequence: FWNEAAAIFFEAAYAADZEA

| Attribute Type | Attributes | Codes |
|---|---|---|
| Commodity group | Gate Valves | VG |
| Commodity part | Gate Valve, Solid Wedge | R |
| Dimension standard | Generic manufacturer | AX |
| Rating | Class 150 | D |
| End prep | Raised-face flanged end | RF |
| Material | ASTM A351-CF8M | R9 |
| Valve Body type | FP Bonnet | H |
| Valve Operator | Handwheel Operator | F |
| Alias Trim | 12 according to API 600, 602 Trim | AAL |
| Alias | Low-Temperature Service | AAT |

Table 5 provided below depicts an example of how the commodity code description is formed if a corresponding attribute does not have a value.

TABLE 5

Example of how the Commodity code description and Commodity code is formed if a corresponding attribute does not have a value

| Attribute Type | Attributes description | Codes |
|---|---|---|
| Commodity group | Flanges | F |
| Commodity part | Weld neck flange | WN |
| Dimension standard | ASME B16.5, Pipe Flanges and Flanged Fittings | AB |
| Rating | Class 150 | D |
| End prep | Flat-face flanged end | FF |
| Material | ASTM A105N | ACP |
| Alias |  | ZZ |
| Surface finish |  | ZZ |

In the above example, the Alias attribute value is not available in the attribute details, and hence a default value of ZZ is inserted instead in its place: So the description "Weld neck flange, ASME B16.5, Pipe Flanges, and Flanged Fittings, Class 150, Flat-face flanged end, ASTM A105N" gives rise to the following commodity code:

"FWNAABDFFAACPZZZZ".

Further, as discussed earlier above, the system may not only be able to: a) standardize different regional attributes in the given description; and b) identify their corresponding attribute types and codes; but also be able to handle complex scenarios where the input description is incomplete or the ordering of the attributes is not maintained, or there are unseen/abbreviated/misspelled attributes/words in the user description. The system may also be defined to consider dimensional standards and material standards, as per the region.

For example, all standards under ASME may come under the US region. Similarly, all standards under JIS will come under the JS region. As per the region, the system may select the Dimensional Standard and Material Standard attributes.

Now, FIGS. 1-10 shall be described to further contribute to the understanding of the various aspects/embodiments, and thereby, to easily practice such aspects/embodiments.

FIG. 1 illustrates a schematic block diagram of a system 100 for generation of a unique identification code 1110 for an industrial commodity, according to an embodiment of the present disclosure. The system 100 includes a processor 124 coupled to a memory 126, at least one database 128, and a plurality of modules 124. The modules 124 include a text segmentation module 106, a rule identification module 108, a receiving module 114, a learning module 122, and retrieving module 116. The retrieving module 116 includes a pre-processing module 118, and a standardization module 120.

Figure 2:
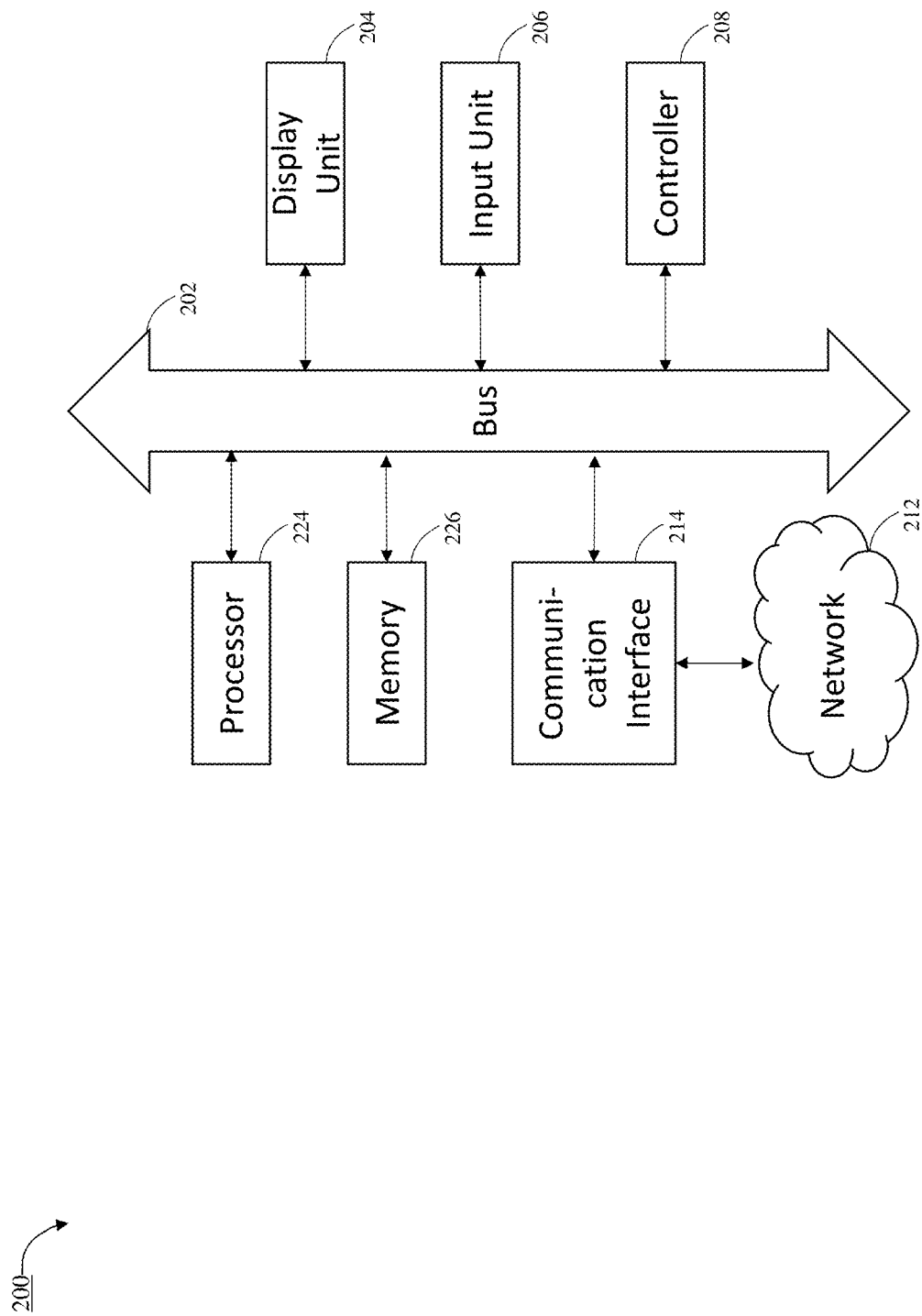
FIG. 2 illustrates a schematic representation of the system of FIG. 1, for generation of the unique identification code for an industrial commodity, according to another embodiment of the present disclosure.

FIG. 2 illustrates a schematic representation 200 of the system 100 for the generation of the unique identification code 1110 for an industrial commodity, according to another embodiment of the present disclosure. The system 200 includes a processor 224 coupled to a memory 226, a display unit 204, an input unit 206, a controller 208, and a communication interface 214 connected with an external network 212. The system 200 further includes a bus 202 to interconnect each of the processor 224, the memory 226, the display unit 204, the input unit 206, the controller 208, and the communication interface 214.

The system 100, 200 is adapted to train/build a model for the generation of a unique identification code for an industrial commodity. For example, the retrieving module 116 is adapted to retrieve at least one user description indicative of at least one constructional and operational characteristic of the commodity. As discussed earlier, the at least one user description is retrieved from at least one database 128. The text segmentation module 106 is in communication with the retrieving module 116 and adapted to: identify at least one attribute from each of the user descriptions, and map the at least one attribute to at least one of predefined attribute types, predefined regional standards, predefined commodity rules, and predefined commodity types. The attribute types, the predefined regional standards, the predefined commodity rules, and the predefined commodity types, may be defined based on information relating to similar commodities received from a second database 128 over a period of time. The rule identification module 108 is in communication with the text segmentation module 106 and adapted to identify a format of the unique identification code 1110 to be generated for the commodity, based on at least one of the predefined attribute types, the predefined regional standards, the predefined commodity rules, and the predefined commodity types.

The system 100, 200 is also adapted to generate a unique identification code 1110 for an industrial commodity. For example, the retrieving module 116 is adapted to receive a user query indicative of at least one constructional and operational characteristic of the commodity, inspect the user query to determine whether the user query is complete for identification of the commodity, and update the user query based on the inspection. The user query is inspected for at least one of: a missing word, a misspelled word, an unseen word, and an abbreviated word based on a plurality of pre-stored words relating to the commodity. The text segmentation module 106 is in communication with the retrieving module 116, and adapted to: identify at least one attribute of the commodity from the updated user query, based on a list of predefined attributes of the commodity, and map the at least one of predefined attribute types, predefined regional standards predefined commodity rules, and predefined commodity types. The rule identification module 108 is in communication with the text segmentation module 106 and adapted to generate the unique identification code 1110 for the commodity, based on the mapping. As described earlier, the predefined attribute/property types include a predefined commodity group and a predefined commodity part.

It will be understood by those skilled in the art that various changes in form and detail may be made therein without departing from the scope of the disclosure. For example aspects may be implemented using any combination of computer programming software, firmware, or hardware.

The memory may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The modules, amongst other things, include routines, programs, objects, components, data structures, etc., which perform particular tasks or implement data types. The modules may also be implemented as, signal processor(s), state machine(s), logic circuitries, and/or any other device or component that manipulate signals based on operational instructions.

Further, the modules 124 can be implemented in hardware, instructions executed by a processing unit, or by a combination thereof. The processing unit can comprise a computer, a processor, a state machine, a logic array, or any other suitable devices capable of processing instructions. The processing unit can be a general-purpose processor which executes instructions to cause the general-purpose processor to perform the required tasks or, the processing unit can be dedicated to performing the required functions. In another embodiment of the present disclosure, the modules may be machine-readable instructions (software) which, when executed by a processor/processing unit, perform any of the described functionalities.

Figure 4:
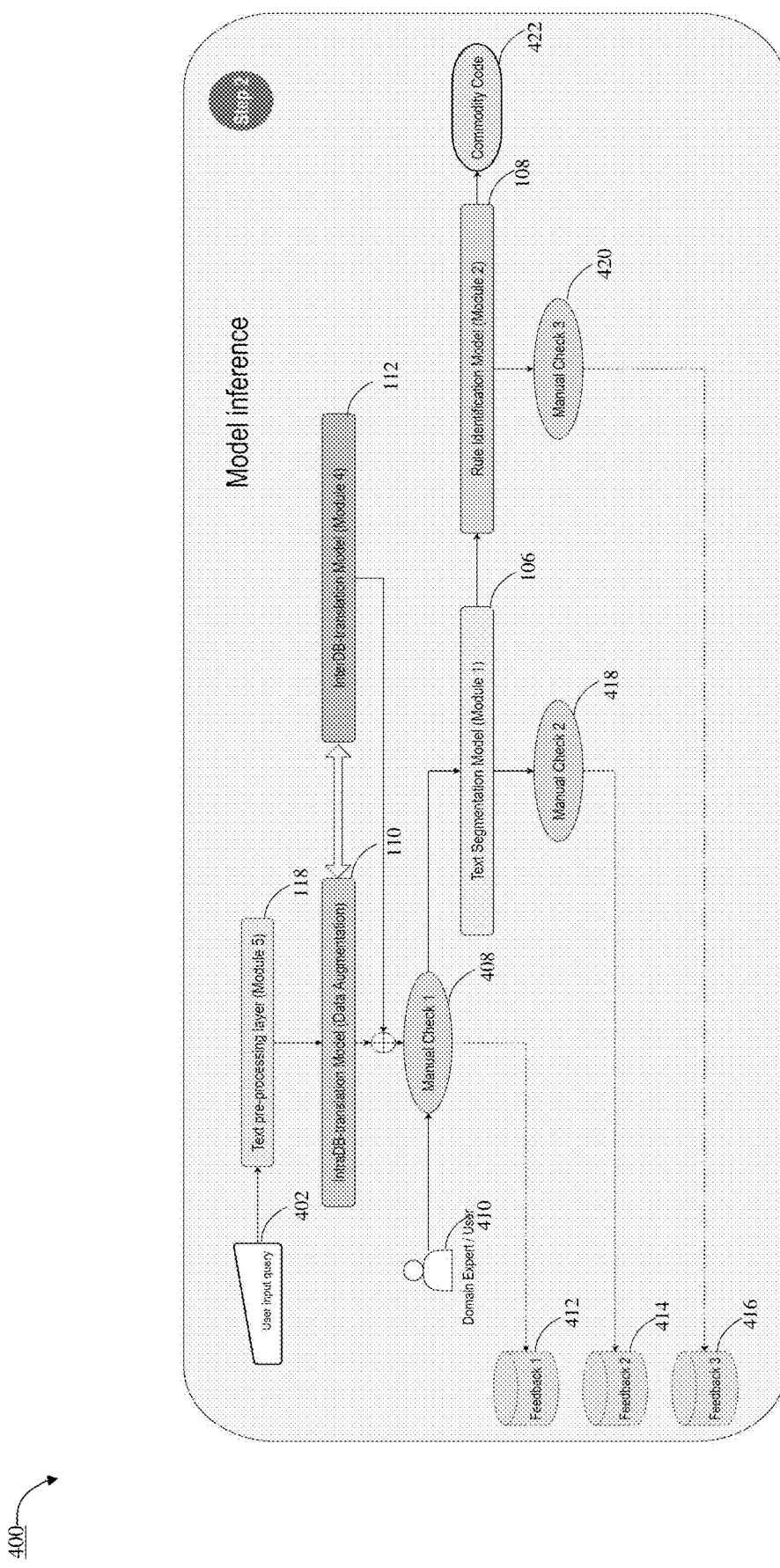
FIG. 4 illustrates a schematic exemplary representation performing an inference of a system of generation of a unique identification code for an industrial commodity, according to an embodiment of the present disclosure.
Figure 5:
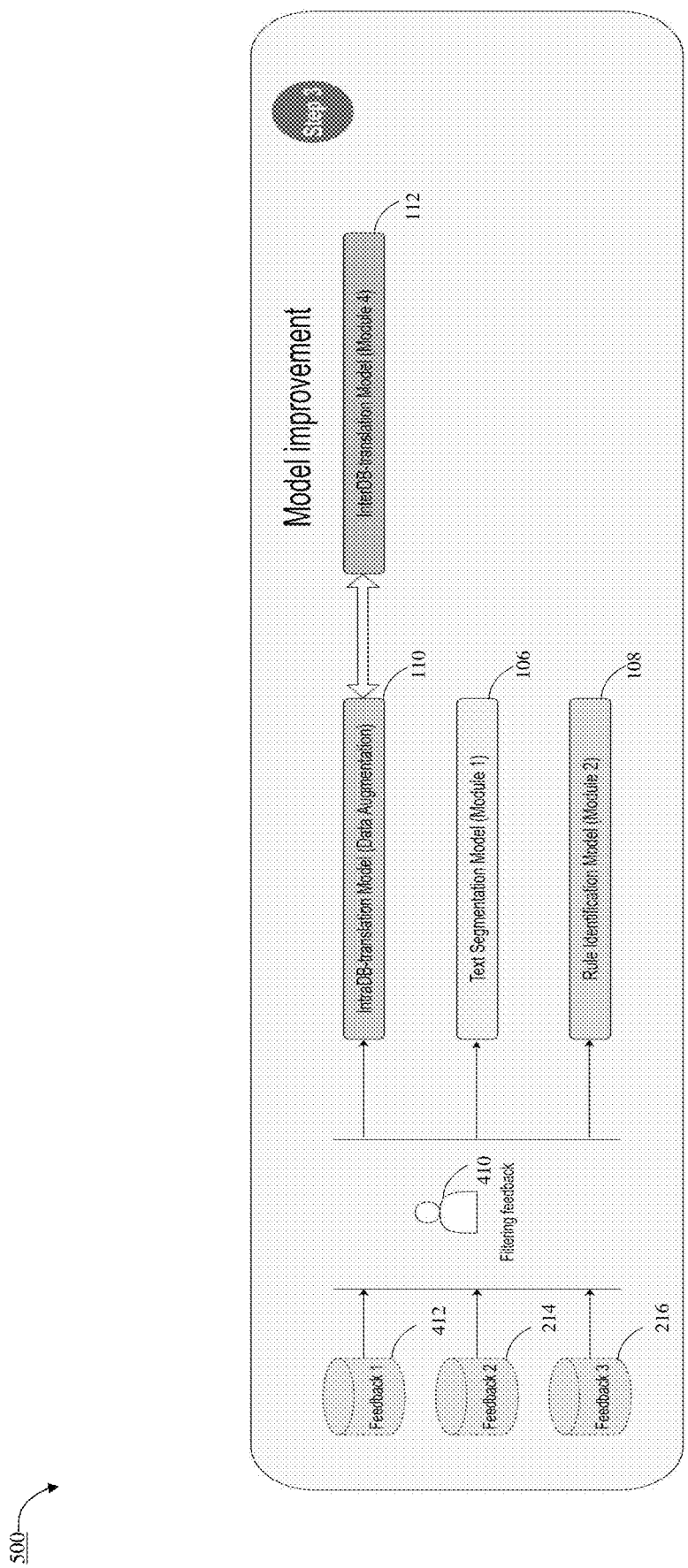
FIG. 5 illustrates a schematic exemplary representation improving a system of generation of a unique identification code for an industrial commodity, according to an embodiment of the present disclosure.

Now, hereinbelow, the workflow, based on the artificial intelligence, will be discussed. The workflow may include a plurality of stages. For example, the plurality of the different stages may include, but are not limited to, (a) Model building/training stage as illustrated in FIG. 3, (b) Model inference stage as illustrated in FIG. 4, and (c) Model improvement/re-training stage as illustrated in FIG. 5.

Figure 3:
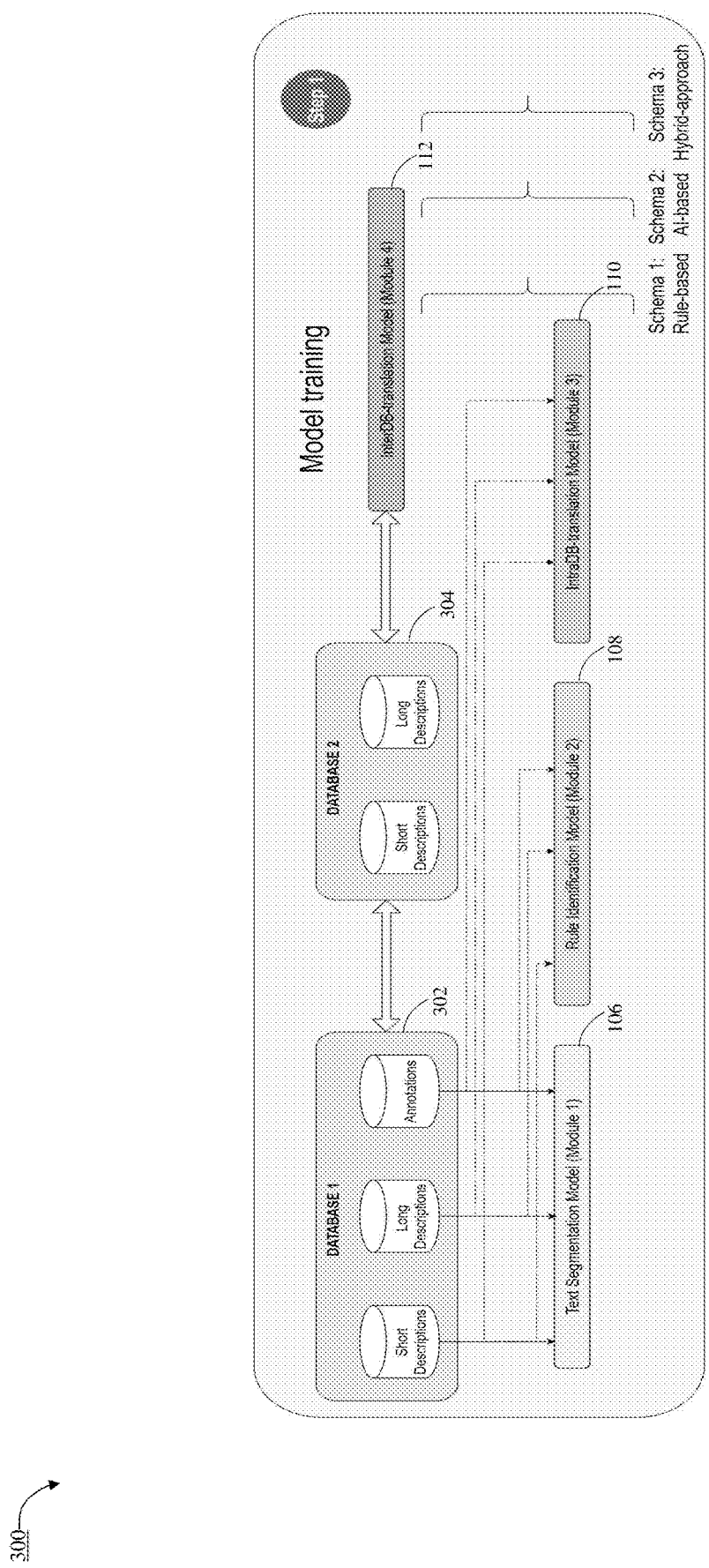
FIG. 3 illustrates a schematic exemplary representation of a system of training of a model for a generation of a unique identification code for an industrial commodity, according to an embodiment of the present disclosure.

FIG. 3 illustrates a schematic exemplary representation of a system of training of a model for a generation of a unique identification code for an industrial commodity, according to an embodiment of the present disclosure. FIG. 4 illustrates a schematic exemplary representation performing an inference of a system of generation of a unique identification code for an industrial commodity, according to an embodiment of the present disclosure. FIG. 5 illustrates a schematic exemplary representation improving a system of generation of a unique identification code for an industrial commodity, according to an embodiment of the present disclosure.

As illustrated in FIG. 3, the Model building/training stage 300 includes four modules: a text segmentation module 106, a rule identification module 108, an IntraDB-translation module 110, and an InterDB-translation module 112. The text segmentation module 106 is adapted to identify different attributes in the given user description, and maps these identified attributes to their respective attribute types. The model training stage may also include a retrieving module (not shown in FIG. 3) adapted to retrieve at least one user description indicative of at least one constructional and operational characteristic of the commodity. The at least one user description is retrieved from at least one database 302. The rule identification module 108 is adapted to identify the structure of the to-be generated commodity code 1110 for the given user description and help in identifying missing attributes which need to be replaced with default codes in the to-be generated code, i.e. the "E's" in the alphanumerical sequence in the example of Table 2 used as filling placeholders in the final commodity code 1110. The IntraDB-translation module is adapted to identify and handle the variability in the different ways an attribute could be represented within the same database, e.g. "weld neck flange" in a long description within the database 302 could be written as "FWN" in a short description within the same database 302. The InterDB-translation module may be adapted to identify and handle the variability in the different ways an attribute could be represented across different databases 304 coming from different tools/standards.

Each of the above-mentioned modules may be built/trained by at least one of the schemas: a) AI-based; b) rules-based; or c) hybrid approach.

Under the AI-based first schema, the model building/training stage 300 as illustrated in FIG. 3 includes four modules: a text segmentation module 106, a rule identification module 108, an IntraDB-translation module 110, and an InterDB-translation module 112. These modules could be implemented jointly using language models trained on the descriptions retrieved from at least one database 302. Some of the AI methodologies used to train such a language model include, but are not restricted to, using sequential modeling architectures like LSTMs (long-short term memory), conditional random fields, autoencoders, hidden markov models, and attention models. These modeling techniques help in understanding the structure of the underlying description comprising of different attributes and learn a mapping function to generate a unique code for each of the identified attributes. Input to such a model, under this schema, is a sequence of attributes as they appear in the description and the output is a sequence of generated commodity codes.

Under the second rules-based schema, the model building/training stage 300 as illustrated in FIG. 3 includes four modules: a text segmentation module 106, a rule identification module 108, an IntraDB-translation module 110, and an InterDB-translation module 112. These modules could be implemented independently using patterns encoded explicitly as rules. Such patterns include, but are not restricted to, user-defined templates for matching, regex codes, "if-then" conditions extracted using domain expertise, and statistical co-occurrences derived from the distribution of descriptions retrieved from at least one database 302. For instance, a text segmentation module 106 would learn to associate the attribute "Gate Valves" to the attribute type "Commodity part" by observing from the previous descriptions, retrieved from at least one database 302, that "Gate valves" and "Commodity part" frequently co-occur together. Similarly, the text segmentation module 106 could learn to associate the attribute "class 150" to the attribute type "Rating" by matching against a pre-defined template "class <numerical sequence>" and executing the rule specifying that if the template matches, associate the matched attribute to the type "Rating".

Under the third hybrid schema, the model building/training stage 300 as illustrated in FIG. 3 includes: a text segmentation module 106, a rule identification module 108, an IntraDB-translation module 110, and an InterDB-translation module 112. These modules can be implemented independently or in a co-dependent manner utilizing, but not restricted to, mentioned methodologies in the first schema or the second schema. These modules could be divided further into sub-modules which would be constructed using the methodologies presented to perform their respective tasks. For instance, the text segmentation module 106 could be further broken down into sub-modules for identifying commodity group, commodity rules, and regional standards separately. The AI methodologies used to implement the above-mentioned modules may either include those mentioned in the first schema or from the following example list (which may not be considered to limit the options available): Linear Regression, Passive-Aggressive Classifier, Stochastic Descent Classifier, Decision Trees, Random Forests, Gradient Boosted Decision Trees, Naïve-Bayes Classifier or any parallel/serial combination of these. The modules in this schema may also be implemented using rule-based methodologies detailed in the second schema. Here the rule-based approaches may include those mentioned in the second schema or from the following example list (which may not be considered to limit the options available): Look-up Table which may be constructed using data structures or other abstraction techniques including but not limited to—dictionary, tuple, list, dataframe, or a combination of these. The text segmentation module 106, could be implemented with the above one of the rule-based approaches and could be combined with AI methodology such as Natural Language Processing (NLP) to store the different patterns which could be helpful for retrieval. These modules may or may not use information provided by other modules in performing their tasks. The workflow may either be in a parallel or serial manner or a combination of these. The tasks performed by these modules may be combined in these manners to give the final commodity codes 1110.

As illustrated in FIG. 4, the Model inference stage 400 may link together the independent modules built/trained in the Model building/training stage 300 to generate a commodity code 1110 for a given user description. The model inference stage 400 includes: (a) preprocessing, by a retrieving module (not shown in FIG. 4) the input user query to handle tokenization and text filtering, (b) augmenting, by the IntraDB-translation module 110, and an InterDB-translation module 112, the attributes in the given user description to handle misspelled/abbreviated/unseen word tokens, (c) identifying, by the text segmentation module 106, attribute types in the filtered/augmented user description, and (d) identifying, by the rule identification module 108, the commodity group, commodity part, and thereafter the commodity rule information from the filtered/augmented user description.

In an embodiment, the output of '(b) augmenting . . . ' can be reviewed 408 by a domain expert 410, and a first feedback 412 may be stored for the next stage. Similarly, the output of (c) identifying . . . ' can be reviewed 418 by a domain expert 410, and a second feedback 414 may be stored for the next stage. Further, the output of '(d) identifying . . . ' can be reviewed 420 by a domain expert 410, and a third feedback 416 may be stored for the next stage. The step of '(d) identifying . . . ' may allow identifying missing attribute types in the input description in order to generate the final commodity code 1110, 422.

As illustrated in FIG. 5, the Model improvement/retraining stage 500 includes using the feedbacks 412, 414, 416 of the domain expert/user 410 from the Model inference stage 400 to improve the performance of the text segmentation module 106, the rule identification module 108, the IntraDB-translation module 110, and the InterDB-translation module 112, by (semi-) automated re-training of the AI-based modules and/or by manually adjusting rules and their parameters present in rules-based modules.

Now, hereinbelow, the Initialization, Rollout, and Re-Training Concept of the will be discussed. The concept of: (a) the initialization may be defined as illustrated in FIG. 6, (b) rollout may be defined as illustrated in FIG. 7, and (c) Re-Training may be defined as illustrated in FIG. 8a and FIG. 8b.

Figure 6:
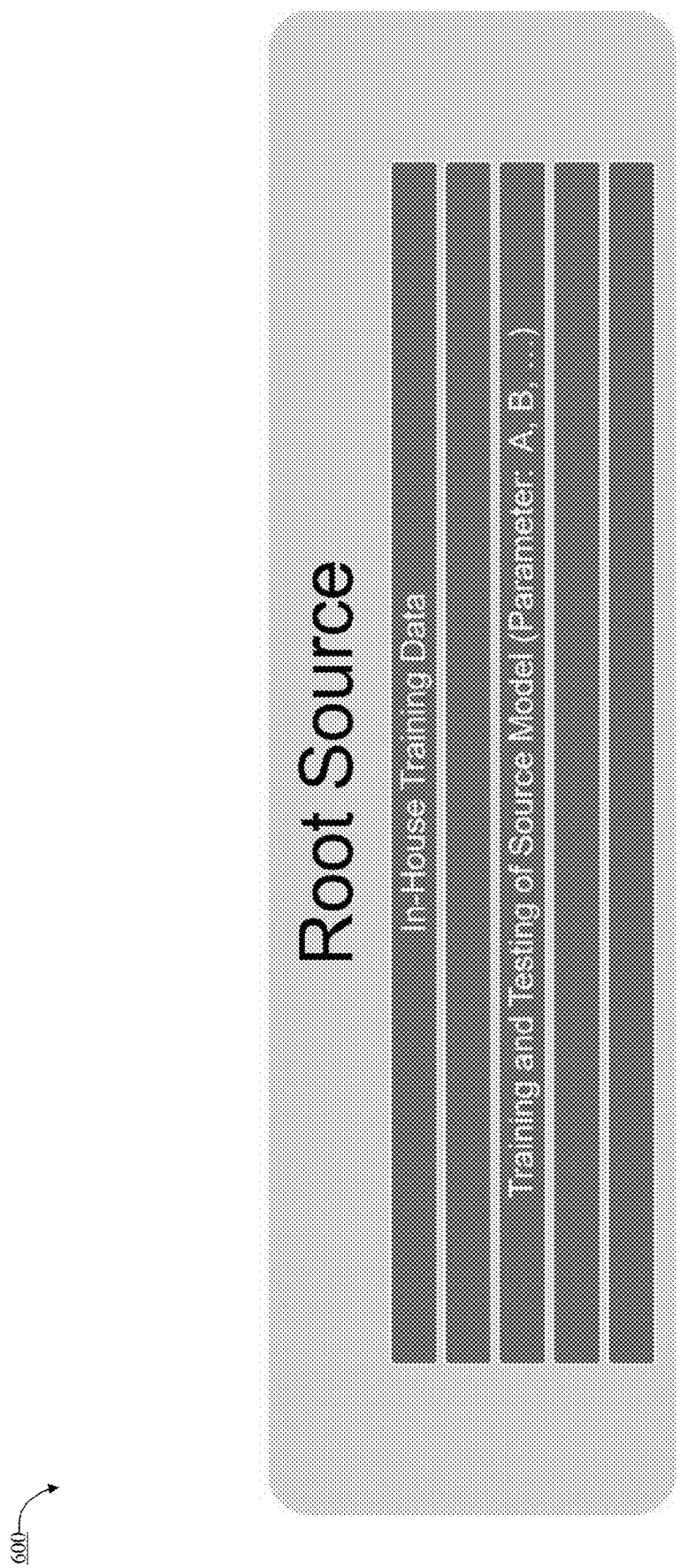
FIG. 6 illustrates a schematic exemplary representation of a trained model for a generation of a unique identification code for an industrial commodity, according to an embodiment of the present disclosure.

FIG. 6, illustrates a schematic exemplary representation of a trained model 600 for a generation of a unique identification code 1110 for an industrial commodity, according to an embodiment of the present disclosure. FIG. 7 illustrates a schematic representation of a subsequent training of a model 600 for a generation of a unique identification code 1110 for an industrial commodity, by a user, according to an embodiment of the present disclosure. FIG. 8a and FIG. 8b illustrates a schematic exemplary representation of two subsequently trained models 802, 806 for a generation of a unique identification code 1110 for an industrial commodity, first by the user of FIG. 7 and second by another user, according to an embodiment of the present disclosure.

Figure 7:
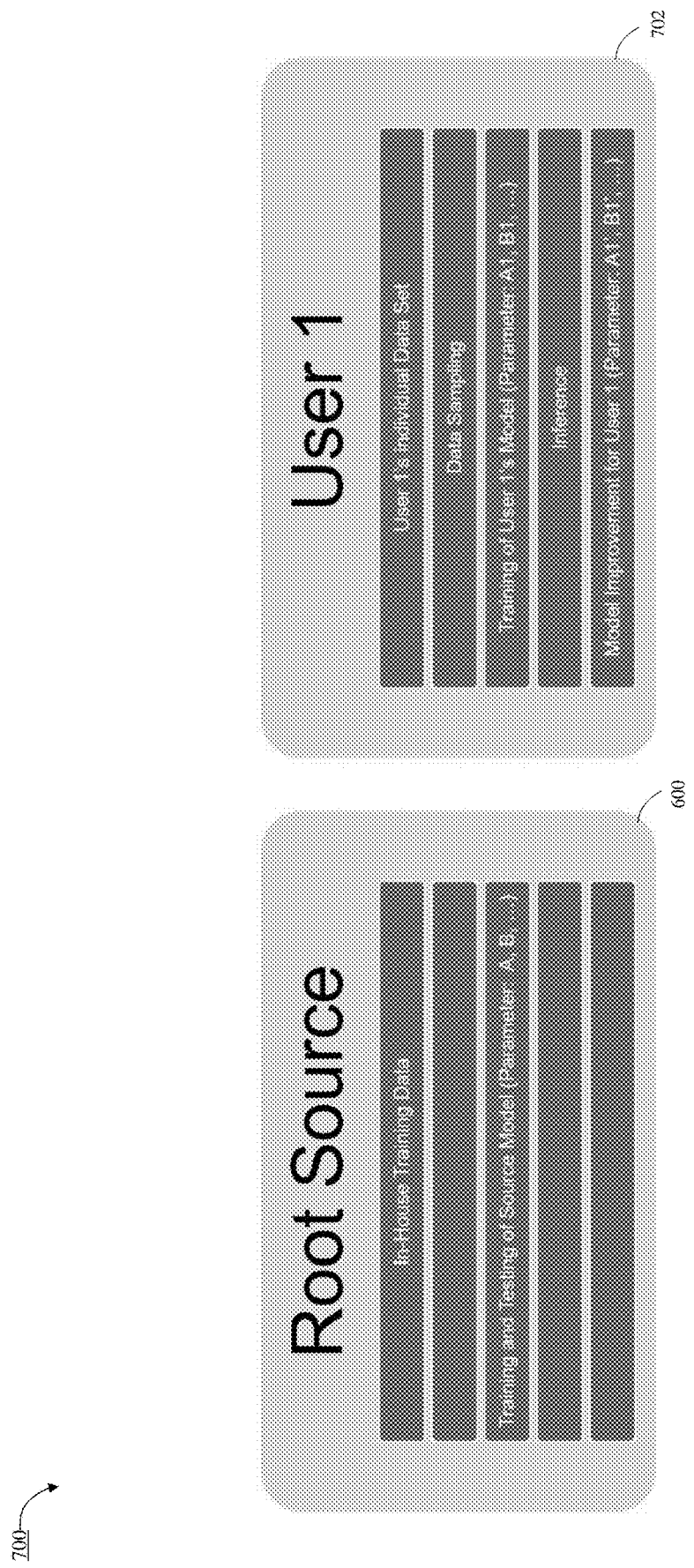
FIG. 7 illustrates a schematic representation of a subsequent training of a model for a generation of a unique identification code for an industrial commodity, by a user, according to an embodiment of the present disclosure.

As illustrated in FIG. 7, the data sampling may compare in-house data with user 1's data set and selects the most insightful samples to get first processed so that training of user 1's model comes with a fast learning rate. The training of the user's 1 model is initialized with parameters A, B, . . . of the source model. By iteratively making use of the operator's feedback (as described in conjunction with FIGS. 4-5) being collected in the model inference stage 400 for retraining, user 1's model is improved towards parameters A1', B1', . . . . By feeding back the data plus annotations, or the learned parameters A1', B1' . . . , of user 1 into the source model 600, a first meta model with parameters AM1, BM1, . . . can be generated. Benchmarking of this meta-model performed on the in-house training data and on user 1's data will indicate the most promising model to replace the original source model 600 for further rollout.

Figure 8A:
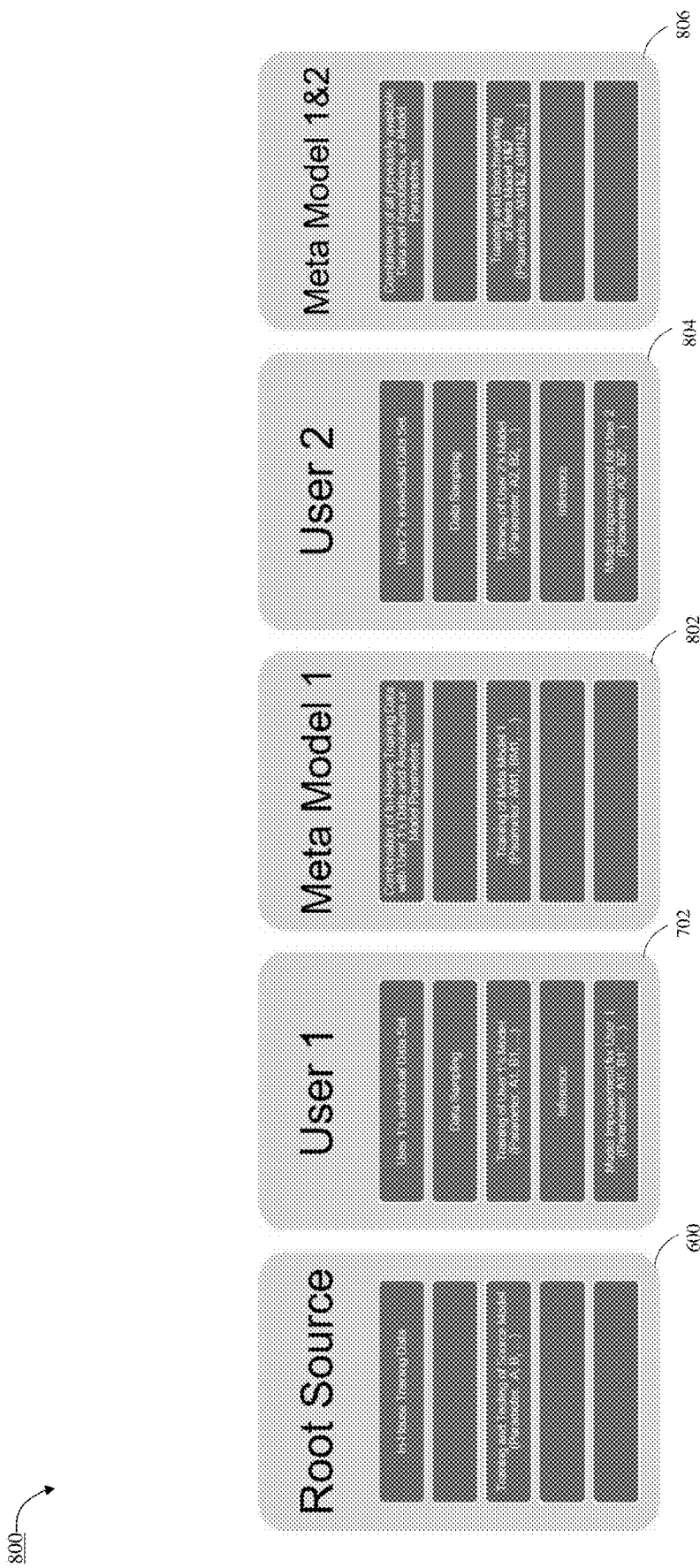
FIG. 8*a* and FIG. 8*b* illustrate a schematic exemplary representation of two subsequently trained models for a generation of a unique identification code for an industrial commodity, first by the user of FIG. 7 and second by another user, according to an embodiment of the present disclosure.
Figure 8B:
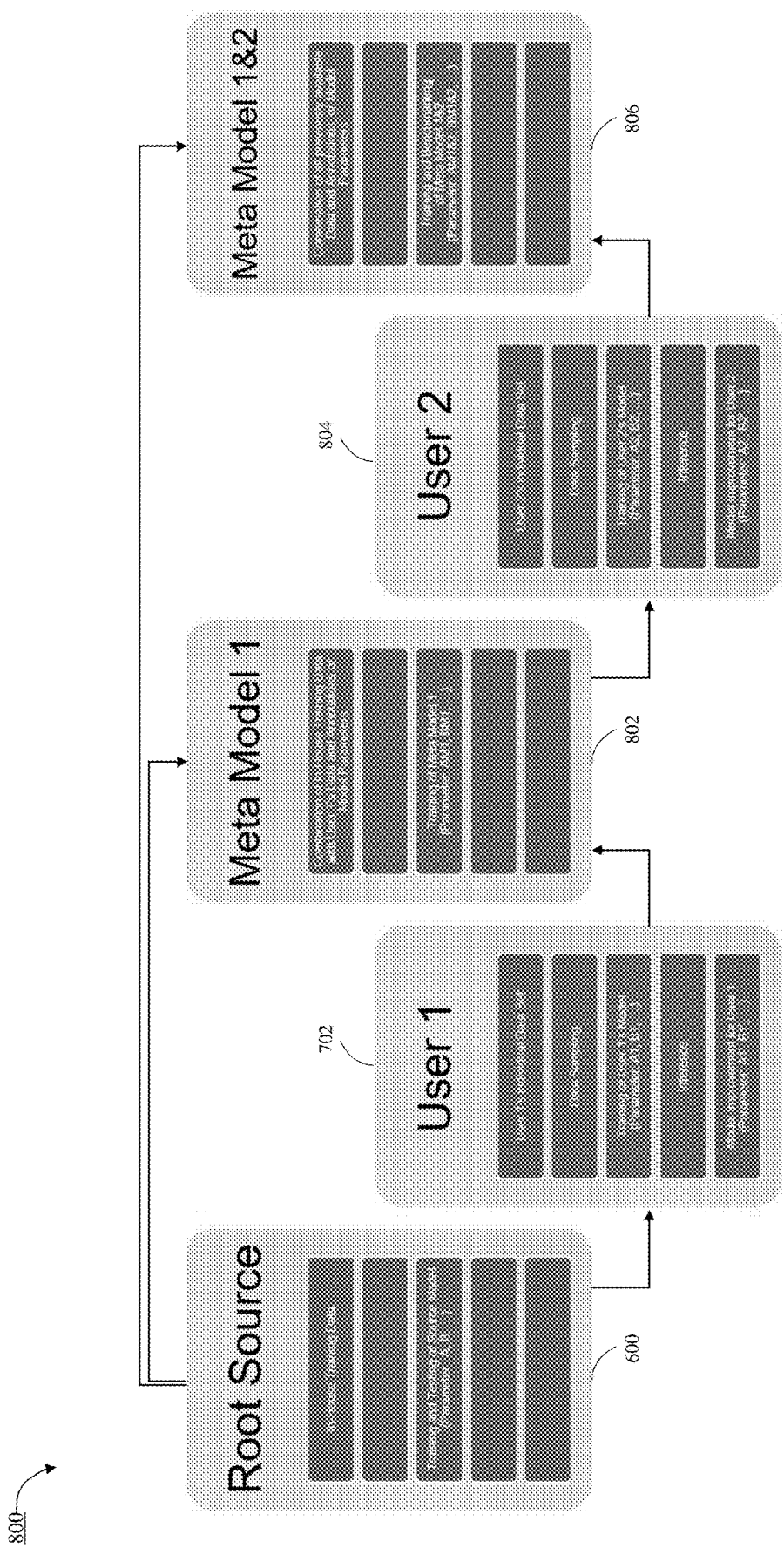

As illustrated in FIG. 8a and FIG. 8b, now the meta-model 1 is rolled out to user 2 and refined based on his application. Then this knowledge is brought back to further improve the meta-model from its version 1 (based on user 1's learning) to version 1&2 (incorporating in addition user 2's learnings).

Figure 9:
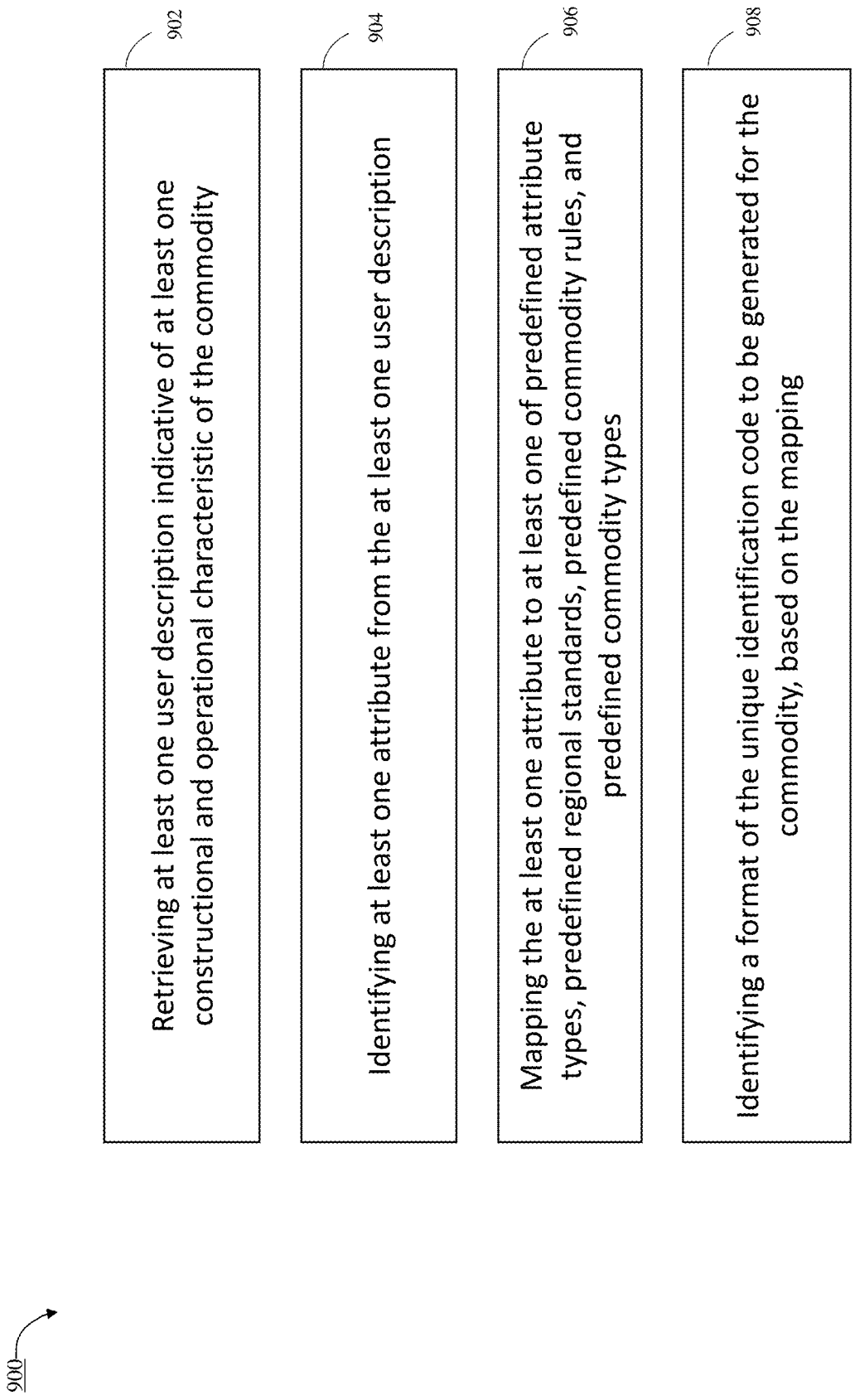
FIG. 9 illustrates a schematic flow diagram of a method of training of a model for a generation of a unique identification code for an industrial commodity, according to an embodiment of the present disclosure.

FIG. 9 illustrates a schematic flow diagram of a method 900 of training of a model for a generation of a unique identification code 1110 for an industrial commodity, according to an embodiment of the present disclosure. The method 900 includes retrieving 902 at least one user description indicative of at least one constructional and operational characteristic of the commodity. The at least one user description is retrieved from a first database. The method 900 further includes identifying 904 at least one attribute of the commodity from the at least one user description. The method 900 furthermore includes mapping 906 the at least one attribute to at least one of predefined attribute types, predefined regional standards, predefined commodity rules, and predefined commodity types. The attribute types, the regional standards, the commodity rules, and the predefined commodity types are defined based on the information relating to similar commodities received from a second database over a period of time. The method 900 furthermore includes identifying 908 a format of the unique identification code to be generated for the commodity, based on the mapping.

The unique identification code or the commodity code includes letters and numerals. The predefined attribute types include a predefined commodity group and a predefined commodity part. The at least one attribute from the at least one description is identified based on at least one of domain-specific standards, specification of the commodity, attribute sequences, and a structure of the commodity code.

Figure 10:
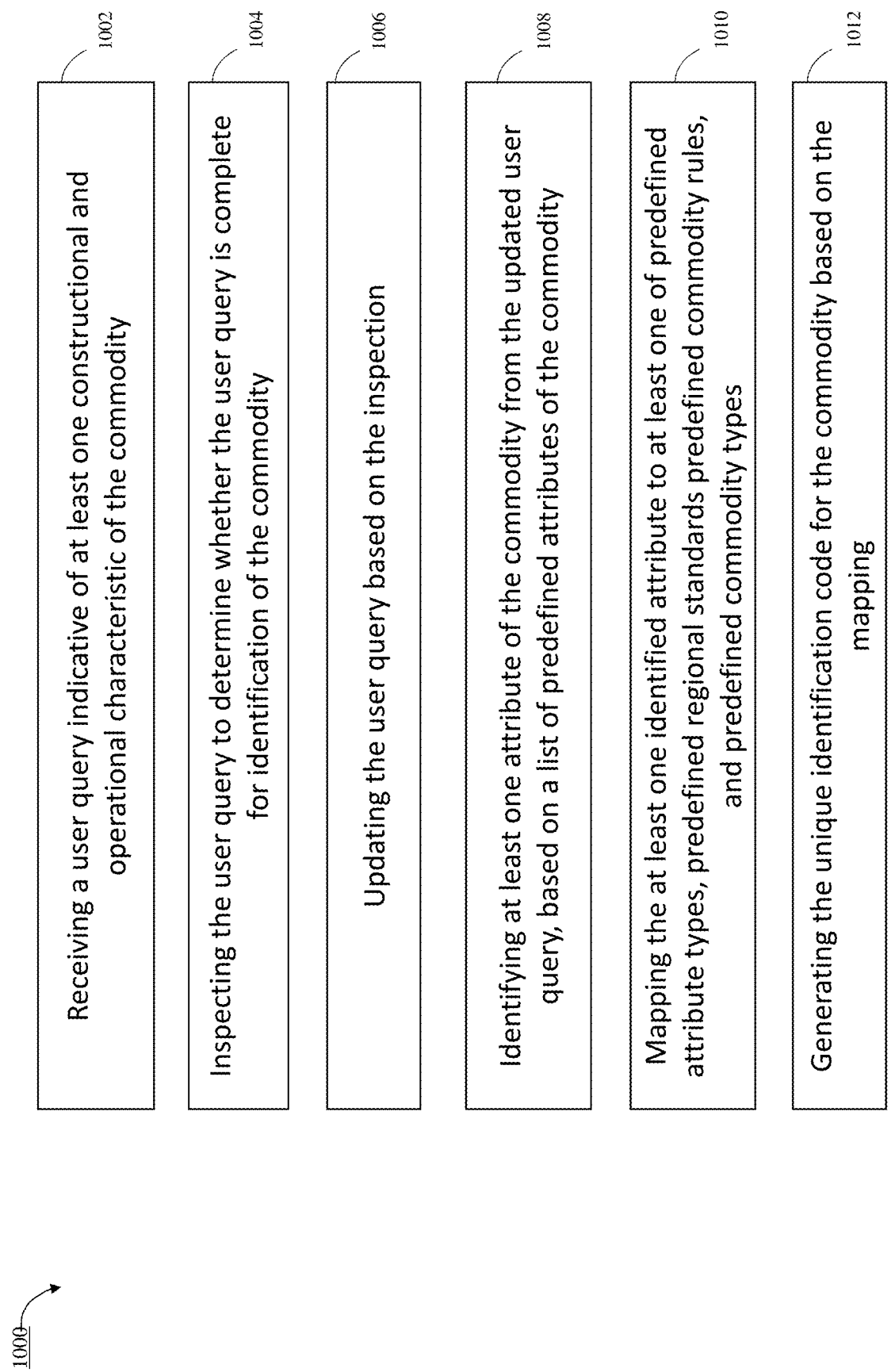
FIG. 10 illustrates a schematic flow diagram of a method for generation of a unique identification code for an industrial commodity, according to an embodiment of the present disclosure.
Figure 11:
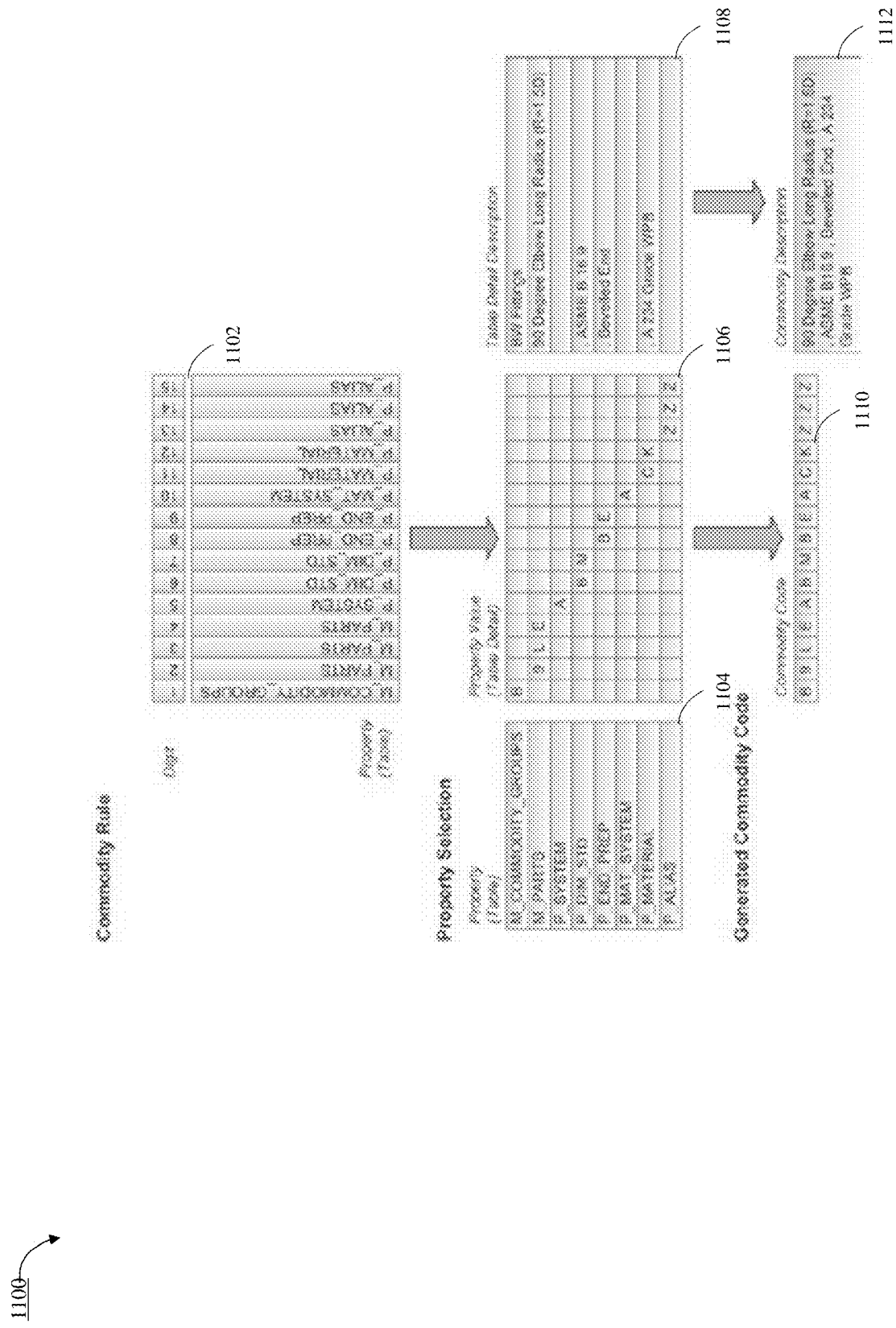
FIG. 11 illustrates a schematic process diagram of relations between a commodity rule and commodity attributes or properties, and how the commodity code is built using this rule and the properties, according to an embodiment of the present disclosure.

FIG. 10 illustrates a schematic flow diagram of a method 1000 for a generation of a unique identification code 1110 for an industrial commodity, according to an embodiment of the present disclosure. The method 1000 includes receiving 1002 a user query indicative of at least one constructional and operational characteristic of the commodity. The method 1000 further includes inspecting 1004 the user query to determine whether the user query is complete for identification of the commodity. The user query is inspected for at least one of: a missing word, a misspelled word, an unseen word, and an abbreviated word based on a plurality of pre-stored words relating to the commodity. The method 1000 furthermore includes updating 1006 the user query based on the inspection. The method 1000 furthermore includes identifying 1008 at least one attribute of the commodity from the updated user query, based on a list of predefined attributes of the commodity. The method 1000 furthermore includes mapping 1010 the at least one attribute to at least one of predefined attribute types, predefined regional standards, predefined commodity rules, and predefined commodity types. The method 1000 furthermore includes generating 1012 the unique identification code for the commodity, based on the mapping. The predefined attribute types is a predefined commodity group and a predefined commodity part.

In an alternative embodiment, the method 1000 further includes receiving at least one of: a first user feedback 412 on the updated user query, a second user feedback 414 on the identification of the at least one attribute of the commodity from the updated user query, a third feedback 416 on the commodity group and/or regional standards, and a fourth user feedback on the generated unique identification code. The method furthermore includes learning at least one of the first user feedback 412, the second user feedback 414, the third user feedback 416, and the fourth user feedback. The method furthermore includes generating the unique identification code for the commodity, based on the learning.

In another alternative embodiment, the learning takes place in at least one of: an online mode, and an offline mode. In the online mode, at least one of the modules gets updated independently on receiving corresponding new user feedback to generate subsequent unique identification codes based on the new user feedback in real-time. In the offline mode, at least one of the modules gets updated at a predefined schedule or in batches of a certain number of feedback items to generate subsequent unique identification codes based on the updates.

The followings are few major advantages of the concepts disclosed:
- Reducing the human effort for translating massive databases of descriptions to their respective commodity codes. Here user queries might also be received from digitized/scanned documents using OCR tools.
- Handling inconsistencies (e.g., missing attributes or wrong ordering) and variability (e.g. abbreviated or misspelled attributes) by augmenting the data with meta-tags.
- Self-learning system to not only account for domain expert's or user's feedback for real-time correction within the inference workflow but using the feedback for the offline re-training of the core modules.
- The continuous feedback-based training by the domain experts or users in the whole process of commodity code generation will enable to build up a model of domain expertise knowledge base, which can be used for future purposes.
- Automated vetting of data within the tool to check for inconsistencies, and variability within the data.
- New codes which may not previously exist in the database can be generated. This is useful in cases where the private companies provide specific/additional requirements for the materials, components or services that are beyond the code and standard requirements. For example, if one wants A106 Gr B pipe with a maximum carbon of 0.23% against standard requirements of 0.3% Max, this requirement should be mentioned in the purchase specification.
- The same values can be described in different terms, e.g. Ball Valve, BValve, etc.
- An optional automated language translation enables processing documents from non-English languages.

Therefore, the system 100 and the methods 900, 1000 generate the commodity code at speed up process. Further, the commodity code is generated the same way even in case of regional description or incorrect/misspelled/missing word in the description, or incomplete description, thereby, the quality of the commodity code is increased, which is further increased by learning during the generation of the commodity codes.

While specific language has been used to describe the present subject matter, any limitations arising on account thereto, are not intended. As would be apparent to a person in the art, various working modifications may be made to the method in order to implement the inventive concept as taught herein. The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment.

What is claimed is:

1. A method of generating a unique identification code for an industrial commodity, the method comprising:
    receiving, by a retrieving module, a user query indicative of at least one constructional and operational characteristic of the commodity;
    inspecting, by the retrieving module, the user query to determine whether the user query is complete for identification of the commodity, wherein the user query is inspected for at least one of a missing word, a misspelled word, an unseen word, and an abbreviated word based on a plurality of pre-stored words relating to the commodity;
    updating, by the retrieving module, the user query based on the inspection;
    identifying, by a text segmentation module, at least one attribute of the commodity from the updated user query, based on a list of predefined attributes of the commodity;
    mapping, by the text segmentation module, the at least one attribute to at least one of predefined attribute types, predefined regional standards, predefined commodity rules, and predefined commodity types;
    generating, by a rule identification module, the unique identification code for the commodity, based on the mapping;
    receiving, by a receiving module, at least one of:
        a first user feedback on the updated user query;
        a second user feedback on the identification of the at least one attribute of the commodity from the updated user query;
        third feedback on the commodity group and/or regional standards; and
        a fourth user feedback on the generated unique identification code;

learning by a learning module, at least one of the first user feedback, the second user feedback, the third user feedback, and the fourth user feedback; and generating, by the rule identification module, the unique identification code for the commodity, based on the learning, wherein the learning takes place in at least one of:

an online mode, wherein at least one of the modules get updated independently on receiving corresponding new user feedback to generate subsequent unique identification codes based on the new user feedback in real-time; and an offline mode, wherein at least one of the modules gets updated at a predefined schedule or in batches of a certain number of feedback items to generate subsequent unique identification codes based on the updates.

2. The method as claimed in claim 1, wherein the predefined attribute types comprise a predefined commodity group and a predefined commodity part.

3. A system of generating a unique identification code for an industrial commodity, the system comprising:

a retrieving module adapted to:

receive a user query indicative of at least one constructional and operational characteristic of the commodity;

inspect the user query to determine whether the user query is complete for identification of the commodity, wherein the user query is inspected for at least one of a missing word, a misspelled word, an unseen word, and an abbreviated word based on a plurality of pre-stored words relating to the commodity;

update the user query based on the inspection;

a text segmentation module in communication with the retrieving module, and adapted to:

identify at least one attribute of the commodity from the updated user query, based on a list of predefined attributes of the commodity; and map the at least one of predefined attribute types, predefined regional standards predefined commodity rules, and predefined commodity types;

a rule identification module in communication with the text segmentation module and adapted to generate the unique identification code for the commodity, based on the mapping;

a receiving module adapted to receive at least one of:

a first user feedback on the updated user query;

a second user feedback on the identification of the at least one attribute of the commodity from the updated user query;

a third user feedback on the commodity group p and/or regional standards; and a fourth user feedback on the generated unique identification code; and a learning module in communication with the receiving module and adapted to learn at least one of the first user feedback, the second user feedback, the third user feedback, and the fourth user feedback, wherein the rule identification module in communication with the learning module, and is adapted to generate the unique identification code for the commodity, based on the learning, wherein the learning takes place in at least one of:

an online mode, wherein at least one of the modules get updated independently on receiving corresponding new user feedback to generate subsequent unique identification codes based on the new user feedback in real-time; and am offline mode, wherein at least one of the modules gets updated at a predefined schedule or in batches of a certain number of feedback items to generate subsequent unique identification codes based on the updates.

4. The system as claimed in claim 3, wherein the predefined attribute types comprise a predefined commodity group and a predefined commodity part.

* * * * *